Figure 1:
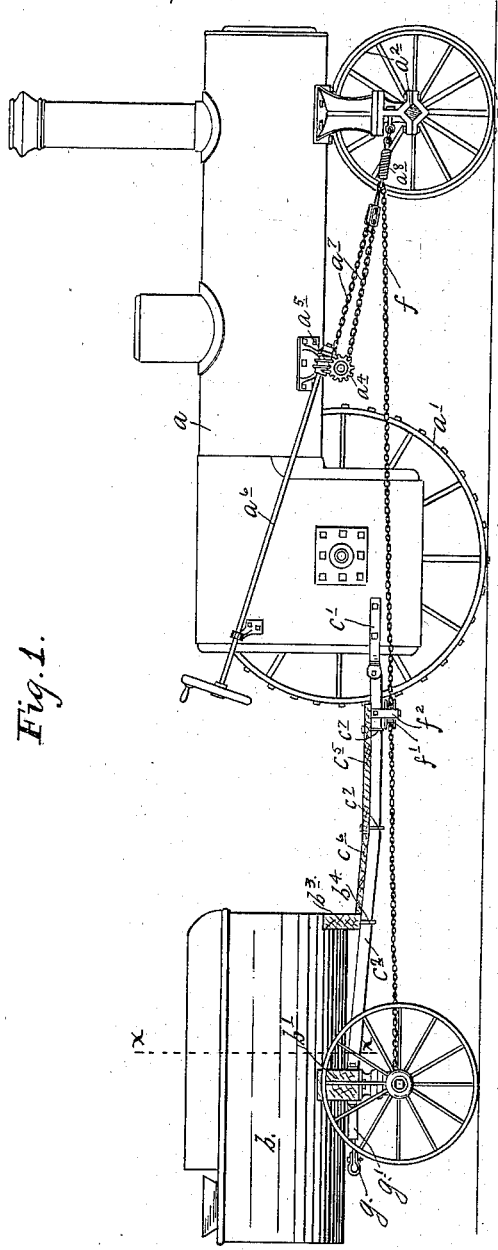

(No Model.) 2 Sheets—Sheet 1.

J. M. FULLER.
STEERING CONNECTION FOR VEHICLES.

No. 552,524. Patented Jan. 7, 1896.

Witnesses:
C. F. Kilgore
R. D. Merchant

Inventor.
James M. Fuller
By his Attorney
Jas. F. Williamson (No Model.) 2 Sheets—Sheet 2.

J. M. FULLER.
STEERING CONNECTION FOR VEHICLES.

No. 552,524. Patented Jan. 7, 1896.

Witnesses:
C. F. Kilgore.
R. D. Merchant.

Inventor.
James M. Fuller,
By his Attorney
Jas. F. Williamson

UNITED STATES PATENT OFFICE.

JAMES M. FULLER, OF SIOUX FALLS, SOUTH DAKOTA, ASSIGNOR TO ERASTUS H. GREGORY AND JOSEPH O. HUMPHREY, OF SAME PLACE.

STEERING CONNECTION FOR VEHICLES.

SPECIFICATION forming part of Letters Patent No. 552,524, dated January 7, 1896.

Application filed March 26, 1895. Serial No. 543,195. (No model.)

*To all whom it may concern:*

Be it known that I, JAMES M. FULLER, a citizen of the United States, residing at Sioux Falls, in the county of Minnehaha and State of South Dakota, have invented certain new and useful Improvements in Steering Connections for Vehicles; and I do hereby declare the following to be a full, clear, and exact description of the invention, such as will enable others skilled in the art to which it appertains to make and use the same.

My invention has for its object to provide improved steering and coupling connections for trains of two or more vehicles, such as traction-engines and tenders coupled to move together, with a view of greater facility of manipulation and an economy in labor.

To these ends my invention consists of the novel features of construction hereinafter described, and defined in the claims.

The invention is illustrated in the accompanying drawings.

Though capable of general application to trains of any kind of vehicles which travel without the use of rails or guide-tracks, the invention was especially designed for trains composed of a traction-engine and a tender for the same, with or without additional vehicles coupled thereto, and hence is so shown in the drawings.

Figure 2:
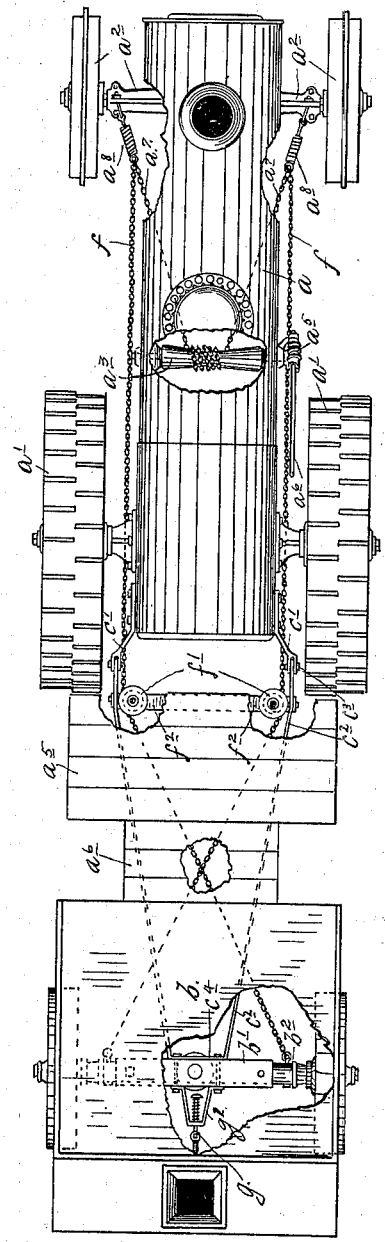
Figure 3:
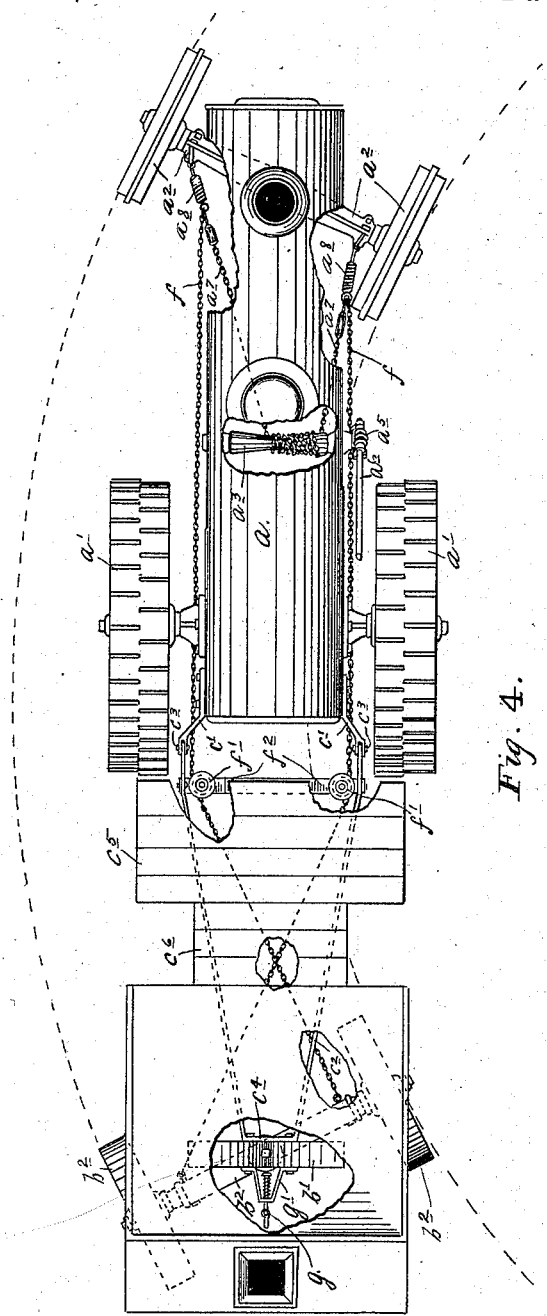
Figure 4:
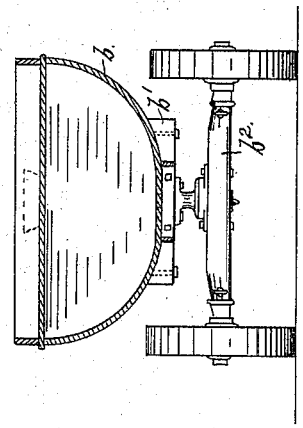

In said drawings, like letters referring to like parts, Figure 1 is a side elevation of a traction-engine and tender having my improvements applied thereto. Fig. 2 is a plan view of the same with some parts broken away, all the connections being shown as they appear when all the wheels are in line with each other. Fig. 3 is a view similar to Fig. 2, with the steering connections shown as they would appear when making a turn; and Fig. 4 is a view, partly in elevation and partly in section, through the tender or second vehicle on the line $x\,x$ of Fig. 1.

$a$ represents the boiler, $a'$ the traction-wheels, and $a^2$ the swiveled forward truck of a traction-engine.

$a^3$ represents the drum of the steering-windlass, which is provided on one end with a worm-gear $a^4$, engaged by the worm $a^5$ on the hand-shaft $a^6$. A steering-chain $a^7$ is wrapped about the drum $a^3$ and has its ends connected to the swiveled truck $a^2$ on opposite sides of the center thereof. These steering-chains $a^7$ are preferably constructed with spring-links $a^8$ or other equivalent devices, so as to make the steering connections operate with a yielding action.

The parts so far described are all of the ordinary standard construction.

$b\,b'\,b^2$ represent the tender, of which parts $b$ is the body portion, $b'$ a bolster rigidly secured to the body $b$, and $b^2$ is a truck swiveled to the bolster $b'$.

The body $b$ of the tender may be of any suitable construction adapted to hold water and fuel.

$c'\,c^2\,c^3$ are connections which serve to couple together the two vehicles, so as to be rigid against endwise or sidewise strains and to be free for pivotal motion in the vertical plane in respect to each other. Of the said coupling parts, $c'$ are side straps or irons rigidly bolted, as shown, to the fire-box of the boiler, $c^2$ is a rigid reach, shown as formed of a single piece or bar of iron, bent upon itself at its center, and $c^3$ are pivot-bolts pivotally connecting the forward ends of the reach-bars $c^2$ to the strap-irons $c'$. The rear end of the reach $c^2$ is rigidly bolted to the tender-bolster $b'$, as shown at $c^4$ in Figs. 2 and 3. This will permit a pivotal motion of the tender and engine, in respect to each other, at the points $c^3$ up and down, but in no other direction. Foot-boards $c^5$ and $c^6$ are shown as supported on the reach-bars $c^2$ between the engine and the tender, and are held from lateral displacement by staples $c^7$ embracing the reach-bar $c^2$, or in any other suitable way.

The tender $b$ is shown as provided with a front end cross-bar $b^3$, which is also connected to the reach-bar $c^2$ by staples $b^4$, or in any other suitable way. Hence, with these coupling connections, the tender-body $b$ and its bolster $b'$ must move laterally with the boiler or engine frame.

To the forward ends of the engine steering-chain $a^7$ are secured tender steering connections $f$, which are shown as in the form of chains. The said chains $f$ or other connections pass rearward over suitable guide-sheaves $f'$, and crossing each other are made fast at their rear ends to the tender-truck $b^2$ on opposite sides of its center. The said guide-sheaves $f'$ are shown as supported in a stirrup-bar $f^2$, fixed to the reach-bars $c^2$ near their forward ends, and serving as a cross tie or brace to the reach at that point. The steering connections $f$ might take other forms than the chains, but are always preferably constructed with flexible sections, and the two connections must be crossed at some point between their respective points of attachment to the engine steering-gear and the tender-truck; or, in any event, they must be so arranged that when the steering wheel or truck of the engine is turned in one direction the steering wheel or truck of the tender will be turned in the opposite direction. With these steering connections, as described, it is obvious that the engine and the tender can both be steered from the common hand-shaft $a^6$ on the engine, that when the swivel-truck or steering-wheel of the engine is set to run the engine on a straight line the tender will follow on the same line, as shown in Fig. 2, and that when the swiveled truck of the engine is set to turn in any given direction the swiveled truck of the tender will cramp or turn in the opposite direction, so as to follow on a similar curve of substantially the same radius. Hence, with these steering connections, the train can be turned in a small space, or on a short radius, with substantially the same freedom as a single vehicle. In virtue of the character of the coupling connections, in cooperation with the steering connections, as described, it is also obvious that the train can be run in either direction, and nevertheless be steered with equal facility from the hand-wheel on the engine. This is a great advantage, as it enables the tender to be always kept with the engine and be handled therewith without any additional operator or attention. It is of special service when moving the engine and the thrashing outfit over the road from one place to another, as sufficient water and fuel may thereby be carried to supply the engine and always be in a position where it is most available for use.

The tender-bolster $b'$ is shown as provided with the spring-seated draw-bar or coupling $g$ held by an angular bar-bracket $g'$, bolted to the rear face of the bolster for the attachment of another vehicle—such, for example, as the thrashing-machine, stacker or other part of the outfit.

In the event that a third or other additional vehicle should be coupled onto the train it must be obvious that by extending steering-chains or other connections from the opposite sides of the center of the bolster-truck $b^2$ to the steering trucks or wheels of the next rearward vehicle, and so on, without crossing all the steering trucks or wheels of the entire train might be operated from the common hand-shaft $a^6$ on the engine and be made to cramp in the proper direction to follow the engine, as shown in Fig. 3 of the drawings. If the same sort of coupling connections were also employed between the second and third vehicles and other successive pairs thereof, it is also obvious that the whole train could be moved in either direction and be turned in any direction desired at the will of the operator on the engine or other single member of the train on which the power device for manipulating the steering connections should happen to be placed.

By actual experience I have demonstrated the efficiency of this invention for the purposes had in view.

It has already been noted that the invention is applicable to a train of any kind of vehicles designed to travel without the cooperation of guide rails or tracks.

The steering-wheels shown for the respective vehicles are in the form of swiveled trucks; but it will be understood, of course, that the same principle of construction would apply in case single steering-wheels were employed.

It should perhaps be noted that the steering-chains $f$ for the tender or other second vehicle are attached to the ends of the engine steering-chain $a^7$, rearward of the spring-links $a^8$, which arrangement gives both sets of connections the benefit of the springs for securing the yielding action in the steering-gear.

What I claim, and desire to secure by Letters Patent of the United States, is as follows:

1. The combination with the portable engine, having a swiveled steering truck, of the tender having also a swiveled truck, the pair of crossed steering connections connecting the opposite sides of said trucks, and a coupling uniting said tender and said engine frame, holding the same rigid against sidewise strain, but permitting vertical pivotal movement of said parts, substantially as and for the purposes set forth.

2. The combination with a traction engine, having a swiveled steering truck $a^2$, of the engine steering devices $a^3$ $a^4$ $a^5$ $a^6$ $a^7$, the tender having a swiveled truck $b^2$, the couplings $c'$ $c^2$ $c^3$, connecting the engine and tender frames, the tender steering chains $f$ crossing each other and extending from the ends of the engine steering chains $a^7$ to the opposite ends of the tender truck, the cross bar $f^2$ connecting the reach-bars $c^2$ and the guide-sheaves $f'$, for the chains $f$, all arranged and operating substantially as described.

In testimony whereof I affix my signature in presence of two witnesses.

JAMES M. FULLER.

Witnesses:
J. J. ALLEN,
K. B. CRESSEY.